US006962319B2

(12) United States Patent
Zheng

(10) Patent No.: US 6,962,319 B2
(45) Date of Patent: Nov. 8, 2005

(54) SAFETY SWITCH FOR A WATER DISPENSER

(75) Inventor: Fang-Zhen Zheng, Shunde (CN)

(73) Assignee: GD Midea Holding Co., Ltd., Shunde (CN)

( * ) Notice: Subject to any disclaimer, the term of this patent is extended or adjusted under 35 U.S.C. 154(b) by 42 days.

(21) Appl. No.: 10/780,224

(22) Filed: Feb. 17, 2004

(65) Prior Publication Data

US 2004/0164098 A1 Aug. 26, 2004

(30) Foreign Application Priority Data

Feb. 20, 2003 (CH) .............................. 03223679 U

(51) Int. Cl.[7] ........................... F16K 35/00; B67B 5/00

(52) U.S. Cl. ................. 251/102; 251/251; 222/153.14; 222/469; 222/509; 222/518; 222/559

(58) Field of Search ................................ 251/101, 102, 251/110, 251, 262, 263; 222/153.14, 469, 222/505, 509, 511, 517, 518, 559

(56) References Cited

U.S. PATENT DOCUMENTS

| | | | | |
|---|---|---|---|---|
| 1,314,199 | A * | 8/1919 | Jarvis | 102/528 |
| 2,701,076 | A * | 2/1955 | Bowman | 141/321 |
| 3,301,525 | A * | 1/1967 | Chernak et al. | 251/331 |
| 5,449,144 | A * | 9/1995 | Kowalics | 251/99 |
| 5,470,044 | A * | 11/1995 | Chi | 251/98 |
| D378,400 | S * | 3/1997 | Kowalics | D23/238 |
| 5,762,317 | A * | 6/1998 | Frahm et al. | 251/95 |
| 6,082,598 | A * | 7/2000 | Lee | 222/509 |
| 6,086,045 | A * | 7/2000 | Moon | 251/335.1 |
| D482,235 | S * | 11/2003 | Yui | D7/398 |
| 6,793,195 | B2 * | 9/2004 | Dou | 251/96 |
| 6,868,994 | B2 * | 3/2005 | Kawolics | 222/517 |
| 6,880,797 | B2 * | 4/2005 | Yui | 251/103 |

* cited by examiner

*Primary Examiner*—David A. Scherbel
*Assistant Examiner*—Patrick Buechner
(74) *Attorney, Agent, or Firm*—Alan D. Kamrath; Nikolai & Mersereau, P.A.

(57) ABSTRACT

A safety switch for a water dispenser includes a sealing ring movably received in the channel to alternatively block communication between the inlet and the outlet, a guiding rod securely received in the sealing ring and having a first spring compressibly mounted around an outer periphery of the guiding rod, a handle adapted to be pivotal relative to the water dispensing tube and having a first distal end securely connected to a second distal end of the guiding rod, a support engaged with an outer periphery defining the channel and a sliding block movably sandwiched between the support and the handle so that movement of the sliding block relative to the support allows the pivotal movement of the handle, which initiates an upward movement of the guiding rod as well as the sealing ring such that the communication between the inlet and the outlet is resumed.

8 Claims, 5 Drawing Sheets

SAFETY SWITCH FOR A WATER DISPENSER

BACKGROUND OF THE INVENTION

1. Field of the Invention

The present invention relates to a safety switch, and more particularly to safety switch for a water dispenser so that an accidental touch of the safety switch will not cause water to flow out of the water dispenser, thus avoiding spillage, potential injury to users etc.

2. Description of Related Art

A conventional water dispenser usually is equipped with a distilled water flagon and a water dispensing mechanism having a switch to control water flow out of the distilled water flagon. By pressing the switch, the distilled water is able to flow out of the distilled water flagon and thus the user is able to enjoy the distilled water. However, when the switch is accidentally touched, such as someone brushing past the dispenser, heated water flowing out of the water dispenser may cause a nuisance or even injury to the people, especially children, nearby the water dispenser. Therefore, to avoid such an unpleasant incident from happening, patents providing safety measurements have been introduced to the market and they do have the ability to prevent such mishap from happening. However, due to the structural complexity and excessive time consumed in assembly, cost of such safety switches is never low.

To overcome the shortcomings, the present invention tends to provide an improved safety switch to mitigate the aforementioned problems.

SUMMARY OF THE INVENTION

The primary objective of the present invention is to provide an improved safety switch which is simple in structure and easy to be assembled.

To accomplish the foregoing objective, the safety switch of the present invention is provided with a sliding block movably received between the handle and support so that when the sliding block is sandwiched between the handle and the support, the handle will not be able to be pivoted to allow the water to flow out of the dispenser and when the sliding block is away from engagement with the support, the handle is able to be pivoted to allow water to flow out of the water dispenser.

Other objects, advantages and novel features of the invention will become more apparent from the following detailed description when taken in conjunction with the accompanying drawings.

DETAILED DESCRIPTION OF THE PREFERRED EMBODIMENT

Figure 1:
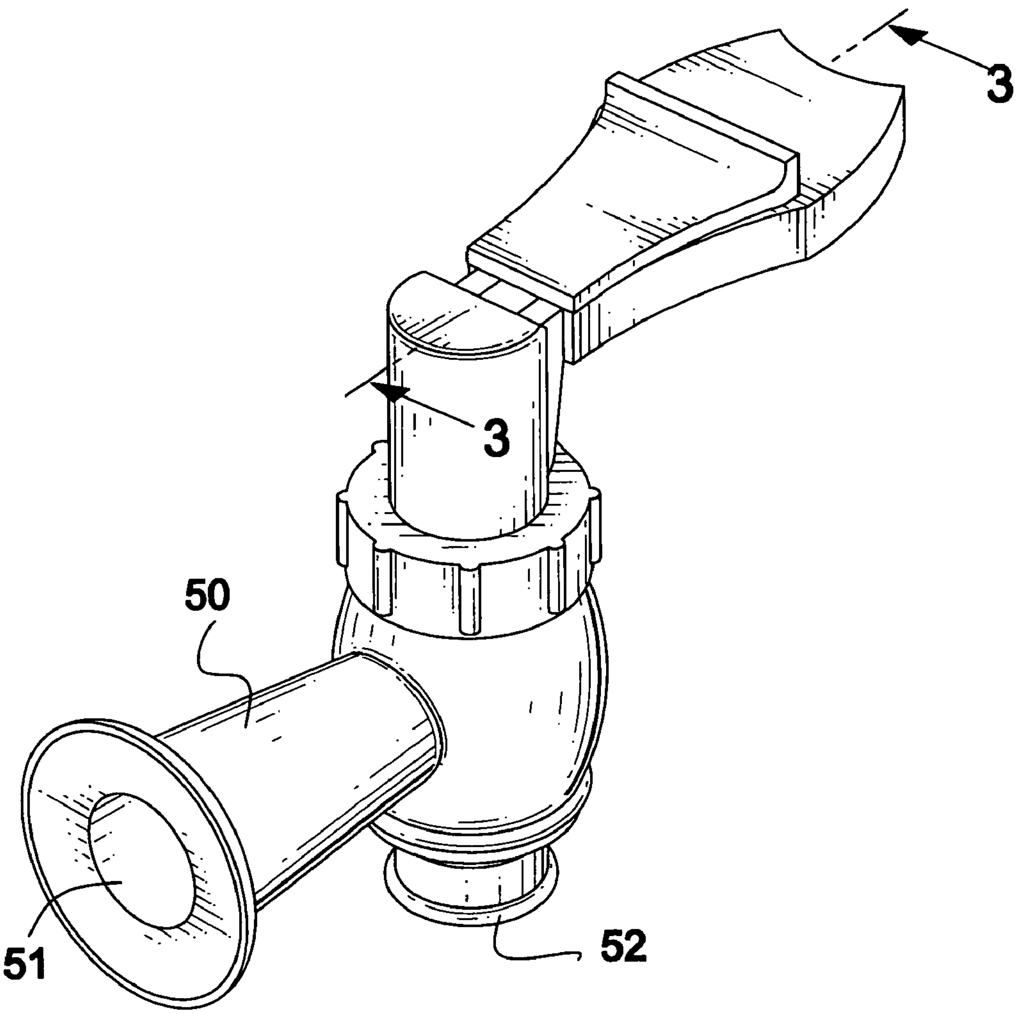
FIG. 1 is a perspective view of the safety switch of the present invention.

With reference to FIG. 1, a safety switch in accordance with the present invention is adapted to combine with a water dispenser (not shown) with a water dispensing tube (50). The water dispensing tube (50) has an inlet (51) for receiving water from the water dispenser and an outlet (52) for allowing the water from the inlet (51) to flow out of the water dispensing tube (50).

Figure 2:
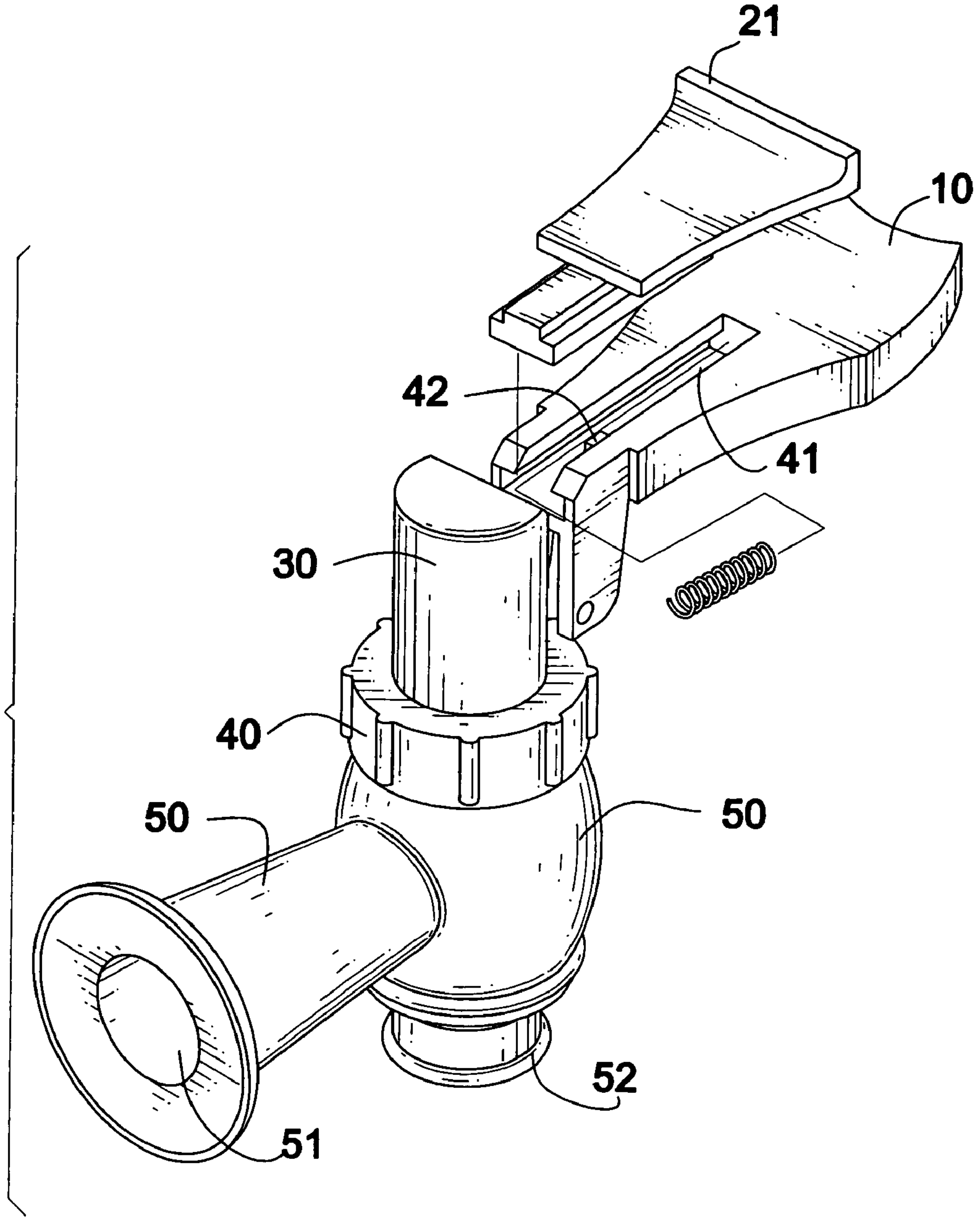
FIG. 2 is an exploded perspective view showing structural relationship between the handle and the sliding block.
Figure 3:
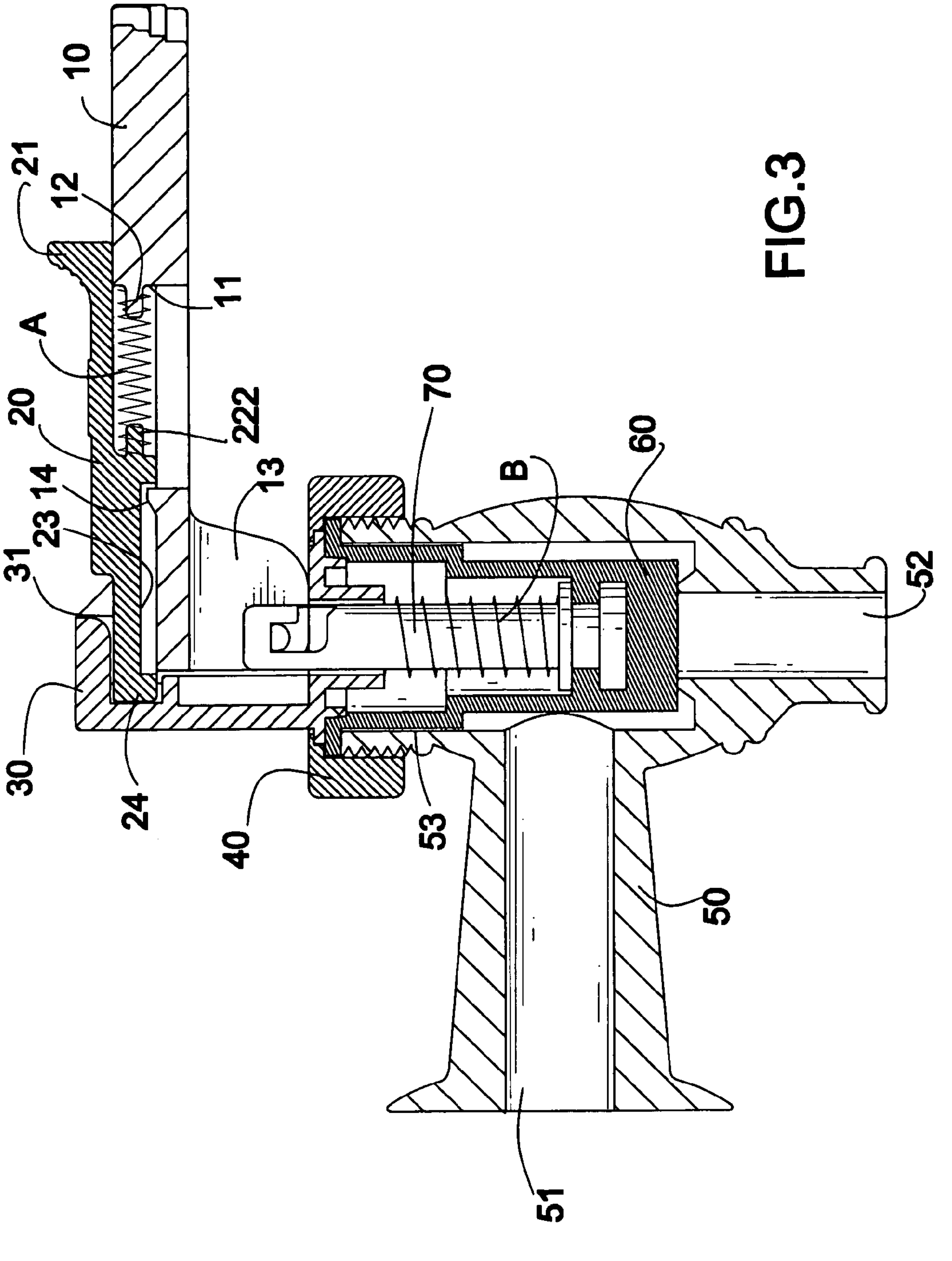
FIG. 3 is a cross sectional view taken by line 3—3 of FIG. 1.

With reference to FIGS. 2 and 3, it is noted that the safety switch of the present invention has a handle (10), a sliding block (20), a support (30) sandwiching the sliding block (20) with the handle (10), a cap (40) mounted on a periphery defining a channel (53) in the water dispensing tube (50) and a sealing ring (60) received in the channel (53) to alternatively block communication between the inlet (51) and the outlet (52).

The handle (10) has a recessed area (11) in a mediate portion of the handle (10), a first protrusion (12) formed on a side face defining the recessed area (11) and two wings (13) extending from a distal end of the handle (10). A stop (14) is formed on a top face of the handle (10). The sliding block (20) is partially and slidably received in the recessed area (11) and has a head (21) formed on a first distal end of the sliding block (20) and on top of the handle (10), a second protrusion (22) formed on a side face of a bottom face of the sliding block (20) to correspond to the first protrusion (11) of the handle (10), a cutout (23) defined in the bottom face of the sliding block (20) and a bent (24) formed on a second distal end of the sliding block (20). A first spring (A) is abutted between the first protrusion (12) and the second protrusion (22).

The support (30) is securely mounted on top of the periphery defining the channel (53) and has a receiving space (31) defined to correspond to and receive therein the bent (24) of the sliding block (20). The cap (40) is threadingly mounted outside the water dispensing tube (50) to secure engagement between the support (30) and the water dispensing tube (50). The sealing ring (60) is received in the channel (53) of the water dispensing tube (50) to alternatively block the communication between the inlet (51) and the outlet (52). A guiding rod (70) with a second spring (B) mounted therearound is received in the sealing ring (60) and securely connected to the wings (13) of the handle (10).

Figure 4:
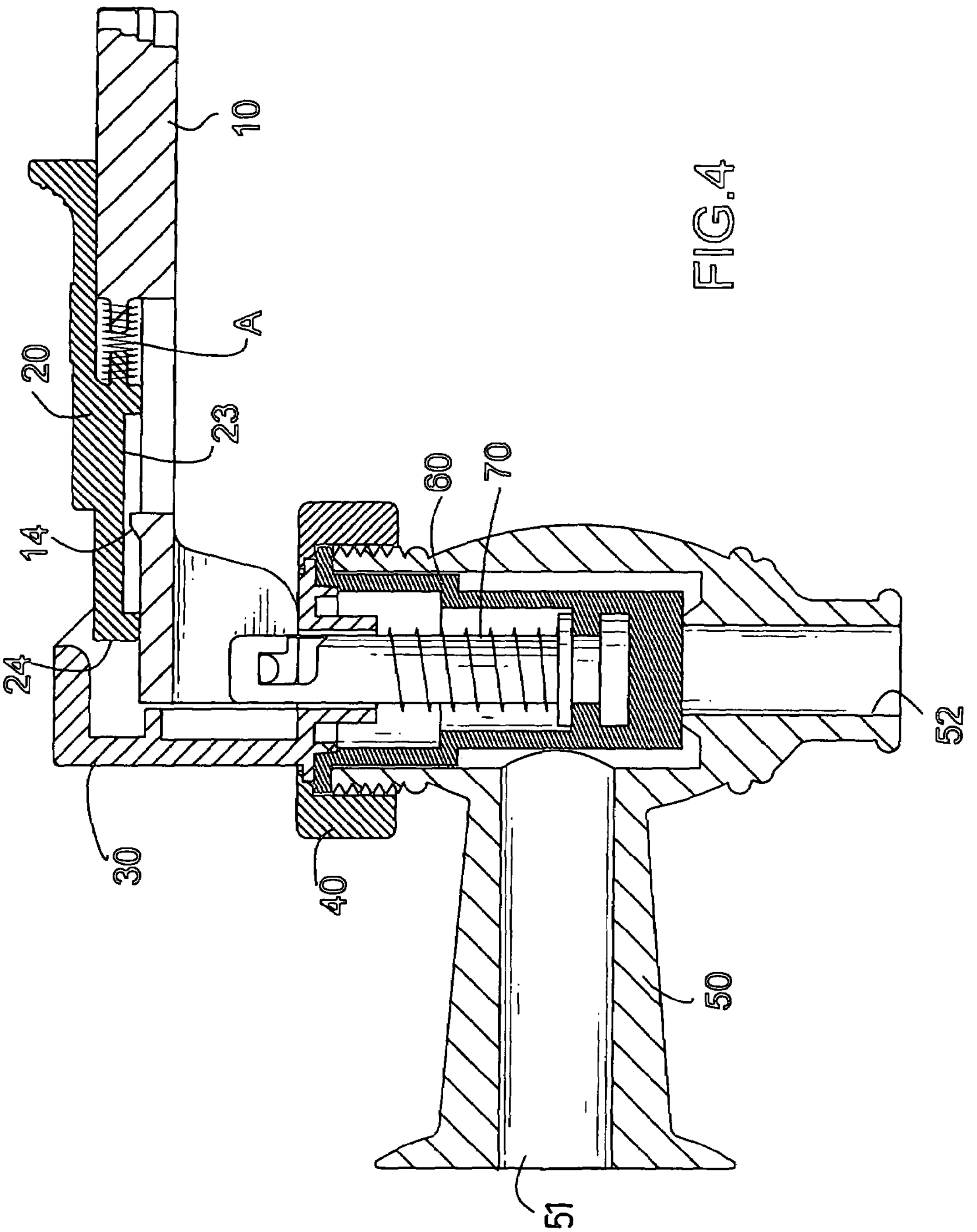
FIG. 4 is an operational schematic view showing the sliding block is moved relative to the handle.
Figure 5:
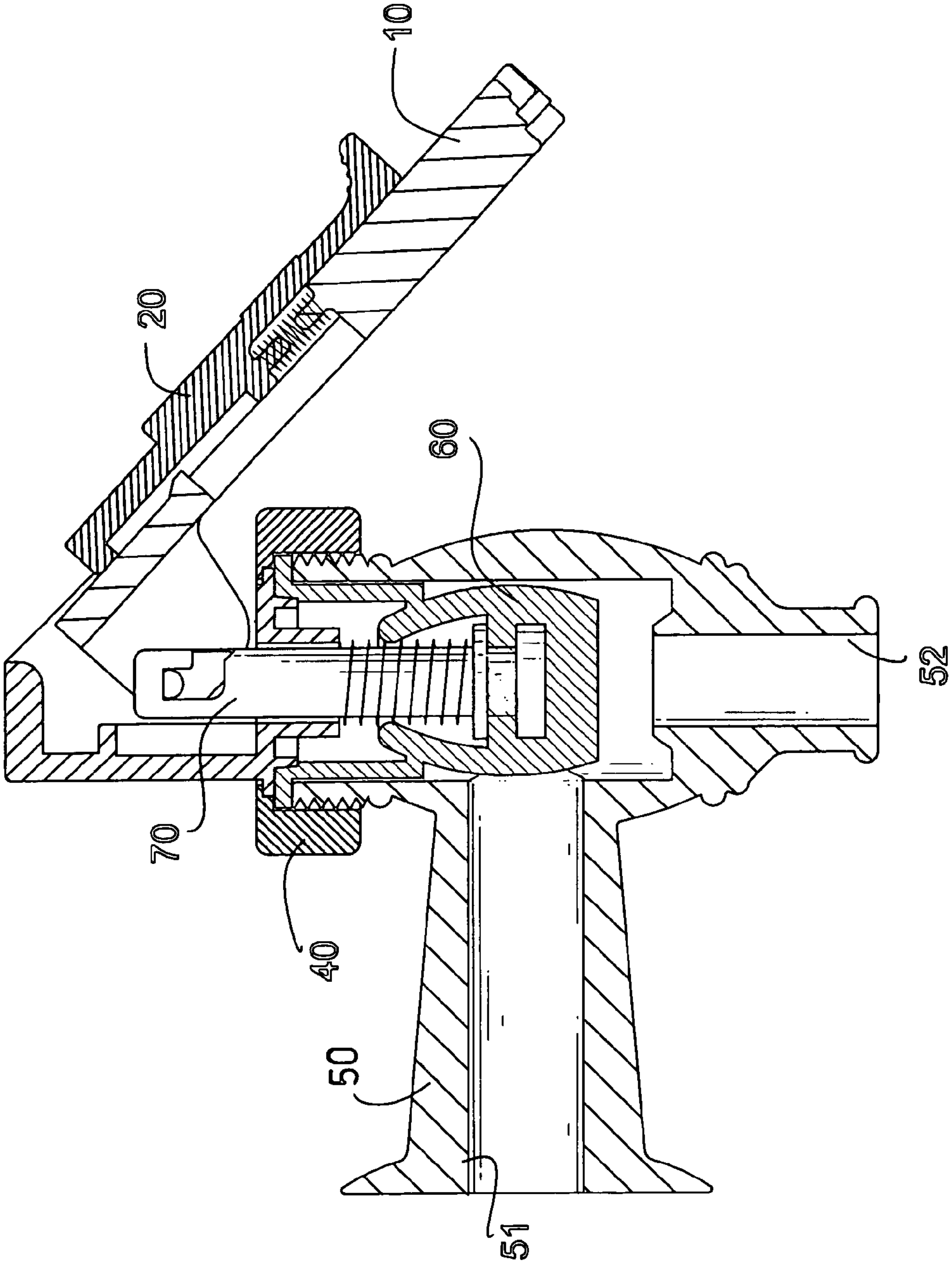
FIG. 5 is an operational schematic view showing that the handle is able to be pivoted as a consequence of the movement of the sliding block.

With reference to FIGS. 4 and 5, after the safety switch of the water dispenser is assembled, the sliding block (20) is able to be moved relative to the handle (10) by pushing the head (21), the bent (24) leaves the restriction of the receiving space (31) of the support (30) and simultaneously the first spring (A) is compressed between the first protrusion (12) and second protrusion (22). Because the bent (24) leaves the limitation of the receiving space (31) of the support (30), the handle (10) together with the sliding block (20) is able to be pivoted and thus the communication between the inlet (51) and the outlet (52) is resumed due to the pivotal movement of the handle (10) and the upward movement of the guiding rod (70).

Therefore, it can be summed up that only after the sliding block (20) is moved relative to the handle (10) and the limitation to the bent (24) of the sliding block (20) by the support (30) is released can the handle (10) be pivoted to resume the communication between the inlet (51) and the outlet (52). Accidental touch of the handle (10) whereby unintended water flow from the water dispenser is avoided and thus the user of the water dispenser is protected from soaking and scalding by heated water.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A safety switch for a water dispenser having a water dispensing tube with an inlet, an outlet in communication with the inlet and a channel in communication with both the inlet and the outlet, the safety switch comprising:

a sealing ring movably received in the channel to alternatively block communication between the inlet and the outlet;

a guiding rod having a first distal end securely received in the sealing ring and a first spring compressibly mounted around an outer periphery of the guiding rod;

a handle adapted to be pivotal relative to the water dispensing tube and having a first distal end securely connected to a second distal end of the guiding rod;

a support having a first distal end adapted to be securely engaged with an outer periphery defining the channel and a second distal end provided with a receiving space; and a sliding block movably sandwiched between the support and the handle so that movement of the sliding block relative to the support allows the pivotal movement of the handle, which initiates an upward movement of the guiding rod as well as the sealing ring such that the communication between the inlet and the outlet is resumed.

2. The safety switch as claimed in claim 1, wherein a second spring is received between the sliding block and the handle to provide a recovery force to the sliding block.

3. The safety switch as claimed in claim 2, wherein the handle has a recessed area defined in a bottom face of the handle and a first protrusion formed on a side face of the recessed area and the sliding block has a cutout defined in a bottom face of the sliding block and a second protrusion formed on a side face defining the cutout to correspond to the first protrusion of the handle such that the second spring is received between the first protrusion and the second protrusion.

4. The safety switch as claimed in claim 1, wherein the sliding block has a bent formed on a first distal end of the sliding block to be received in the receiving space of the support so that when the bent is received in the receiving space, the handle is unable to be pivoted relative to the support and when the bent is away from the receiving space, the handle is able to be pivoted to initiate the upward movement of the guiding rod.

5. The safety switch as claimed in claim 3, wherein the sliding block has a bent formed on a first distal end of the sliding block to be received in the receiving space of the support so that when the bent is received in the receiving space, the handle is unable to be pivoted relative to the support and when the bent is away from the receiving space, the handle is able to be pivoted to initiate the upward movement of the guiding rod.

6. The safety switch as claimed in claim 1 further comprising a cap adapted to be threadingly connected to the outer periphery defining the channel to secure the engagement of the first distal end of the support with the outer periphery defining the channel.

7. The safety switch as claimed in claim 3 further comprising a cap adapted to be threadingly connected to the outer periphery defining the channel to secure the engagement of the first distal end of the support with the outer periphery defining the channel.

8. The safety switch as claimed in claim 5 further comprising a cap adapted to be threadingly connected to the outer periphery defining the channel to secure the engagement of the first distal end of the support with the outer periphery defining the channel.

* * * * *